United States Patent [19]
Sander

[11] 3,859,518
[45] Jan. 7, 1975

[54] CCD LIGHT CHANGE MONITOR FOR SENSING MOVEMENT ETC.

[75] Inventor: Wendell B. Sander, Cupertino, Calif.

[73] Assignee: Fairchild Camera and Instrument Corporation, Mountain View, Calif.

[22] Filed: Jan. 7, 1974

[21] Appl. No.: 431,262

[52] U.S. Cl. ................................ 250/209, 250/221
[51] Int. Cl. .......................................... G06m 7/00
[58] Field of Search .................... 250/209, 221, 578

[56] References Cited
UNITED STATES PATENTS

| | | | |
|---|---|---|---|
| 2,016,036 | 10/1935 | Fitzgerald | 250/221 |
| 3,660,667 | 5/1972 | Weimer | 250/578 |

*Primary Examiner*—James W. Lawrence
*Assistant Examiner*—T. N. Grigsby
*Attorney, Agent, or Firm*—Roger S. Borovoy; Alan H. MacPherson

[57] ABSTRACT

An apparatus for sensing changes in ambient light conditions including a charge-coupled device ("CCD") which is capable of both sensing the amount of incident light upon the device as well as storing, in the form of charge, an amount of charge proportional to such incident light; an inverter coupled across the charge-coupled device between input and output for inverting the charge as it serially passes through the inverter between the output and the input of the CCD; and a timer for initiating the transfer of charge from the storage portion of the CCD through the inverter, and back to the same cells of the array from which the charge had previously been shifted out; and a detector for detecting the resulting summation of the charges in the storage portion of each cell of the array to see whether the net result of the addition of the negative of the previous charge (which is proportinal to the incident light during the previous time interval) to the new charge (which is proportional to the incident light during a second exposure in a later time interval) produces a difference, indicating a change in the scene.

8 Claims, 3 Drawing Figures

Patented Jan. 7, 1975 3,859,518

CCD LIGHT CHANGE MONITOR FOR SENSING MOVEMENT ETC.

BACKGROUND OF THE INVENTION

1. Field of the Invention

This invention is in the field of apparatus for detecting changes in ambient light conditions, and in particular, to the use of a CCD for both detection of light and storage of the charge which is proportional to the amount of light detected.

2. Prior Art

Low light level TV cameras coupled to signal-storage units are well known in the theft and pollution-control industry. A remotely controlled low light level TV camera, coupled to a signal-storage unit, provides an optical or acoustical alarm whenever the TV camera spots a movement or variation in the scene upon which it is focused. In an unattended mode of operation, the camera first records and stores the video signals of a particular object, and then continuously compares them with the signals of subsequently taken pictures of the same scene. The signals are normally stored on a rotating disk or tape or other well known analog or digital storage medium. In the event the level of change exceeds a predetermined threshold level, the system responds to such change between the original and subsequently recorded images by giving an alarm.

Systems of this type are used in theft prevention in many industrial areas, banks and the like, as well as to detect variations in the composition of liquids, or gases, for example to monitor sewage water or to spot irregular and pollution-causing combustion processes.

The systems of the prior art require two major components: (1) a TV camera; and (2) a signal-storage unit, such as disk or tape. As a result, the systems are very expensive and can only by used where the value of the material being protected is extremely high, as in the case of banks.

The apparatus of the subject invention, however, combines in a single electronic component — a charge-coupled device or CCD — the ability both to sense the pattern of incident light and to store the pattern for comparison with a subsequent exposure or "frame". As a result, the system of the invention is much less expensive and can be used for protecting homes, farms, and small businesses.

BRIEF DESCRIPTION OF THE INVENTION

Briefly, the apparatus for sensing changes in ambient light conditions of the invention includes: a CCD for image sensing having an array of cells having at least one row or column, each of the cells having a light-sensitive portion which provides an output signal in the form of an electrical charge, the magnitude of which is dependent upon the amount of light incident upon the light-sensitive portion, and a storage portion which stores that charge, the array having serial input and output; means for exposing each of the light sensitive portions of each of the cells to incident light; an inverter series-coupled between the output and the input of the array, the inverter inverting the charge stored in the storage portion of each cell to a charge of opposite polarity and of substantially the same magnitude when the charge passes through the inverter; a timer coupled to the array for first initiating the shift of charge stored in the storage portion of each of the cells during a first time interval along each of the rows or columns and through the inverter and back to the input of the array, the shifting being continued until the charge has been inverted and returned to the respective storage portions of all the cells, and second, initiating the transfer of the electrical charge resulting from the exposure of the light-sensitive portions of the cells during a second time interval from the light-sensitive portions to the storage portions of each of the cells, whereby the charge then stored in the storage portions of each of the cells will be cancelled to the extent that the magnitude of the incident light on the cells during the two time intevals remains the same; and a detector for detecting the resulting summation of the charges in the storage portions of the cells of the array after the completion of both time intervals.

DETAILED DESCRIPTION

Figure 1:
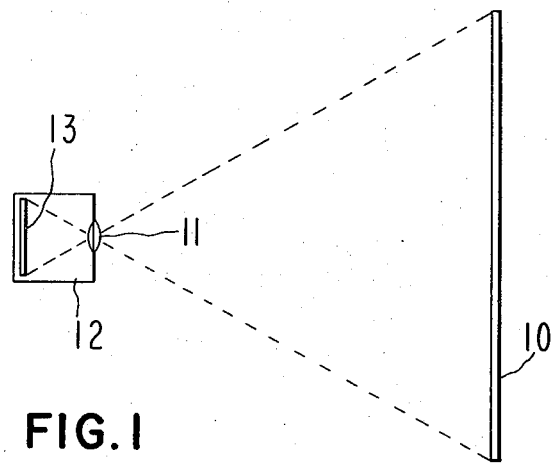
FIG. 1 is a simple, pictorial description of the apparatus of this invention.

Referring to FIG. 1, the apparatus of the invention is pictorially illustrated. The monitored scene 10 is continuously observed by lens 11 of CCD camera 12 which is focused on the scene, as shown. In conventional fashion, the lens then images the scene on the CCD 13. In FIG. 1, only the edge of the CCD is shown. Actually, CCD 13 can be a linear or area CCD array of conventional type. These linear and area arrays have been described in the prior art, for example, U.S. Patent applications Ser. No. 343,759 filed on Mar. 22, 1973 by C. Kim and R. Dyck, and Ser. No. 391,119 filed Oct. 27, 1973, by L. Walsh, both assigned to the same assignee as this invention.

Figure 3:
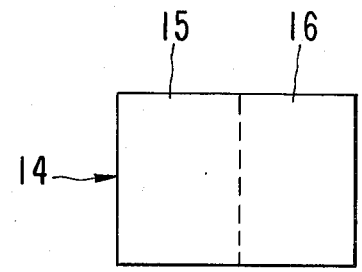
FIG. 3 is a schematic representation of a single cell of the CCD array of the invention.

Although the details of the CCD arrays are fully described in the above-referenced patent applications, for the purposes of the subject invention, a single cell of a CCD array is equivalent to the cell 14 schematically represented in FIG. 3. Cell 14 has a first light-sensitive portion 15 and a second charge-storage portion 16. All of the cells discussed in connection with this invention have two such portions for light detection and storage of resulting charge. Each cell has a means for transferring or "gating" charge packets, hereinafter referred to as "charges", generated in the light-sensitive portion of the cell along shift register lines from one cell to the next adjacent cell. These transfers are conventionally timed by a timing means, or clock. Between transfers the charges are stored in the storage portion 16 of the cell 14. Shifting is accomplished in response to clock pulses using light-transparent gate electrodes associated with each of the light-sensitive elements of the cell. The details of the construction and operation of the linear and area arrays of this invention will be found in the above-referenced patent applications.

Figure 2:
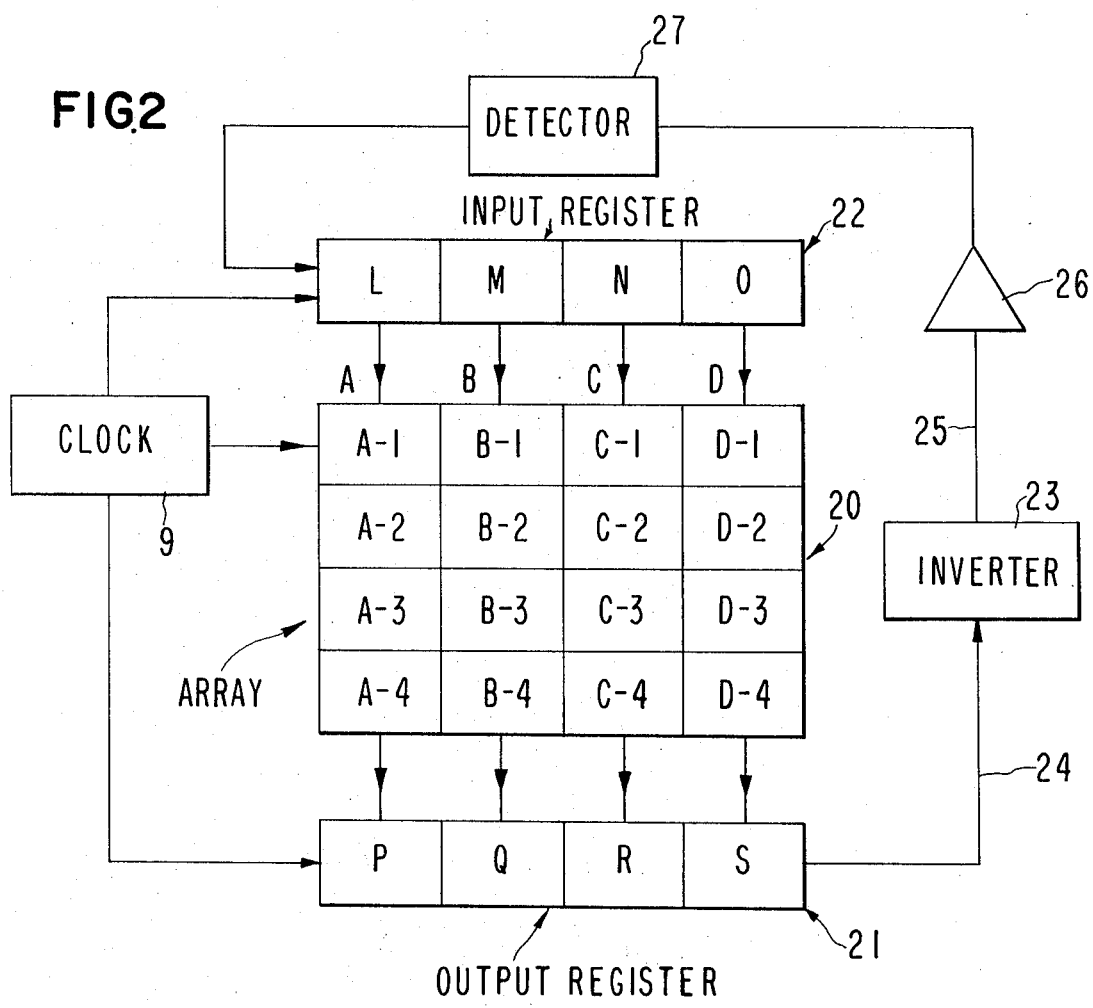
FIG. 2 is a block diagram of the apparatus of the invention.

Referring now to FIG. 2, the operation of the apparatus of this invention will be described in more detail.

CCD array 20 contains 16 individual cells labeled A-1, A-2, A-3, A-4, B-1, B-2, B-3, B-4, C-1, C-2, C-3, C-4, D-1, D-2, D-3, D-4 arranged in four columns labeled A, B, C, and D. Obviously the term row and the term column are merely terms of reference and could be interchanged without in any way changing the operation of the array. In this description, the vertical direction is termed a column, and the horizontal direction is termed a row (although the reverse nomenclature has, from time to time, been used).

The operation of the invention can be best understood by considering a series of time intervals. The first exposure time interval will be called the "first frame". During the first frame, each of the cells A-1 through D-4 of array 20 is exposed to light directed upon it from lens 11 (FIG. 1). The light sensitive portion 15 (FIG. 3) of the cell 14 provides an output signal in the form of an electrical charge. In response to a clock pulse signal from clock 9, this charge is passed to the storage portion 16 (FIG. 3) of the same cell. A clock pulse for this transfer is provided by the timing means on clock 9 for each frame. The magnitude of the electrical charge is dependent upon the amount of light incident upon the first portion of the cell during the first frame. Thus the charge in the second portions of each cell is proportional to the amount of light incident upon the cell during the first frame.

During a second time interval the clock 9 shifts the charge stored in each storage portion of each cell of the array in a downward direction in the columns to the next adjacent cell. Accordingly, the charge stored during the first frame in cells A-1, B-1, C-1, and D-1, respectively, are shifted downwardly to cells A-2, B-2, C-2, and D-2. Similarly the charges stored during the first frame in cells A-2, B-2, C-2, and D-2 are shifted downwardly, respectively, into cells A-3, B-3, C-3 and D-3. The charges in the third row are shifted in the same manner to the fourth row. The charges in the fourth row (cells A-4, B-4, C-4, and D-4) are shifted into cells P, Q, R, and S, respectively, of output register 21. As will be explained later, the charge stored in cells L, M, N, and O, of input register 22 will be shifted into the first row (cells A-1, B-1, C-1 and D-1) at the same time (during each respective shift which occurs during this second time interval).

In the event that input and output registers 22 and 21 are not employed, the charges may be inverted by shifting directly from the fourth row through inverter 23 and back into the first row of array 20. In such an embodiment, an inverter is required for each column. However, where output register 21 and input register 22 are employed, a third time interval is used for the inversion process.

During such a third time interval, the charges in the storage portions of the cells of array 20 are left unaffected. However, the charges stored in the four cells of output register 21 are shifted serially through line 24, inverter 23, through line 25 and into input register 22. Thus the previous charge in cell P of output register 21 will wind up in cell L (in the same column as cell P) of input register 22. However, the charge will be the electrical inverse of the charge in cell P of output register 21. Similarly, the inverted charge in cell Q of output register 21 will appear in cell M of input register 22. The inverted charge of cell R will be transferred to cell N; and the inverted charge in cell S will be transferred to cell O. This all occurs during the third time interval.

In the embodiment of the invention using input and output registers, described above, a separate such time interval, called the "third time interval" is required for inversion after each downward shifting step of the second time interval. Accordingly, when the charge in row 1 is shifted downwardly to row 2 (at the same time the charge in row 4 is shifted to the output register 21) a third time interval is employed to invert the charge then stored in the output register 21 and return the inverted charge to input register 22. During the next succeeding second time interval, the inverted charge in input register 22, which came from output register 21, will be shifted into row 1. Five "second" time intervals, all but the last one being followed by a third time interval, are required to completely invert the charge in every cell of array 20 and to replace the previous charge in each cell with an equal, inverted charge.

In certain instances, there will be electrical losses in the shifting operation. To overcome these losses, an amplifier 26 is inserted in series into line 25 (or alternatively, into line 24) to compensate for the losses and to bring the charge entering input register 22, and subsequently into array 20 to the same level, although inverted, as the charge previously stored in the same cells of the array before shifting.

After the completion of the shifting and inversion of the array, a second exposure frame will take place. During the second frame, again, an amount of charge will be transferred to the storage portions of each of the cells of array 20 proportional to the amount of light incident upon the light-sensitive portions of the cells. This transfer again will be initiated by clock 9. It will now be apparent that if the amount of light incident on each cell of the array is unchanged from the previous frame, that the charge passed to the storage portion of each cell will be of equal magnitude, but of opposite polarity, to the charge stored during the first frame (which has now been inverted during a set of second and third time intervals). Accordingly, these stored charges will cancel each other out.

In order to detect whether the charges during the two exposure time intervals did indeed cancel each other out, a detecting means is provided which operates during a fourth detection time sequence after the completion of both exposure frames. The easiest technique for detection is to repeat the shifting cycle (all of the second and third time intervals) after each successive second frame. To accomplish this, a detector 27 is inserted into line 25 (or into line 24) coupling the input and output registers 21 and 22. If there has been no change in the incident light between the two successive frames, the subsequent shifting of all the charges downwardly through the array and then serially through output register 21 and input register 22 through inverter 23, amplifier 26 and detector 27 there will be no signal or a "null" in detector 27. Obviously, the threshold of detector 27 can be adjusted to accommodate noise and other normal interference not occasioned by a scene change without sounding an alarm. However, if there has been a significant change in the incident light conditions or "picture" upon the array between the two frames, the charges will not cancel themselves out in each of the cells of array 20, and there will be at least some positive or negative charges passing through detector 27 during the detection sequence. Detector 27 can be connected to an alarm, a telephone dialer, or other conventional intrusion alarm apparatus to provide a signal indicating a change in conditions in excess of the minimum threshold.

Obviously the use of sixteen cells is merely representative, and many more (or less) cells may be used. The number of cells in each row, moreover, does not have to equal the number in each column. Furthermore, instead of an area array as shown in FIG. 2, a single line, or linear array can be employed to detect changes along a single line of a room. The operation is the same as described above for the area array of FIG. 2, except only a single column, such as column A, is employed.

The apparatus of the invention has significant advantages over the prior art. No separate storage apparatus must be employed, as in the prior art, to store the detected images. Moreover, unlike the systems of the prior art using separate detection and storage, the registration between successive images is nearly and storage, so that errors and erroneous signals are almost completely eliminated.

I claim:

1. Apparatus for sensing changes in ambient light conditions comprising:
   a charge-coupled device for image sensing having an array of cells having at least one row or column, each of said cells having a light-sensitive portion which provides an output signal in the form of an electrical charge, the magnitude of which is dependent upon the amount of light incident upon said first portion, and a storage portion which stores the charge from said first portion, said array having serial input and output means;
   means for exposing each of said light-sensitive portions of each of said cells to incident light;
   an inverter means series-coupled between said output means and said input means of said array, said inverter means inverting the charge stored in the storage portion of each cell to a charge of opposite polarity and of substantially the same magnitude when such charge passes through said inverter;
   a timing means coupled to said array for first initiating the shift of charge stored in said storage portions of each of said cells during a first time interval along each of said rows or columns and through said inverter means to the input means of said array, said shifting continuing until the charge has been inverted and returned to the respective storage portions of all of said cells, and second, initiating the transfer of the electrical charge resulting from the exposure of said light-sensitive portions of said cells during a second time interval from said light-sensitive portions to said storage portions of each of said cells, whereby the charge then stored in said storage portions of each of said cells will be cancelled to the extent that the magnitude of the incident light on said cells during said two time intervals remains the same; and
   means for detecting the resulting summation of the charges in the storage portions of the cells of said array after the completion of both time intervals.

2. The apparatus of claim 1 further characterized by said inverter means including an amplification means sufficient to compensate for losses in the charge magnitude as a result of the shifting of charge through said array.

3. The apparatus of claim 1 further characterized by said inverter means being coupled between the first and last cells of each row or column of cells, said inverter means thereby inverting the charge stored in said last cell and passing said inverted charge to the storage portion of the first cell of the same row or column of said array.

4. The apparatus of claim 3 further characterized by the addition of a first register, said first register having a means for temporarily storing the charge stored in the last cell of each of said rows or columns of said array, said timing means initiating the transfer of the electrical charge stored in said last cell in each of said rows or columns of said array in to said first register during said first time interval.

5. The apparatus of claim 4 further characterized by said timing means including a means for shifting, during a third time interval which immediately follows said first time interval, the contents of said first register serially through said first register, through said inverter means, and back to said first cells in each row or column of said array.

6. The apparatus of claim 5 further characterized by the addition of a second register, said second register being coupled between said first cells of each of said rows or columns of said array and said inverter means, whereby, during said third time interval, the charges from said first register are passed through said inverter means to said second register.

7. The apparatus of claim 6 further characterized by said timing means also initiating the transfer of the charges stored in said second register into said first cells of each of said rows or columns of said array during said first time interval.

8. The apparatus of claim 5 wherein said timing means causes the repetition of said shifting of charge through said first register following each shift of charge through said array during said first time interval, said shifting being repeated until the charges which initially were in said storage portions of the cells of said first row or column are returned to said first cells of each of said rows or columns after being inverted by being passed through said inverter means.

* * * * *